No. 730,483. PATENTED JUNE 9, 1903.
M. SCHWARTZ.
HORSESHOE.
APPLICATION FILED APR. 7, 1903.
NO MODEL.

Witnesses:
Arthur Juncker
Edward Ray

Inventor:
Martin Schwartz
by his attorney
Frank v. Briesen

No. 730,483. Patented June 9, 1903.

UNITED STATES PATENT OFFICE.

MARTIN SCHWARTZ, OF PASSAIC, NEW JERSEY.

HORSESHOE.

SPECIFICATION forming part of Letters Patent No. 730,483, dated June 9, 1903.

Application filed April 7, 1903. Serial No. 151,430. (No model.)

*To all whom it may concern:*

Be it known that I, MARTIN SCHWARTZ, a citizen of the United States, residing at Passaic, Passaic county, New Jersey, have invented certain new and useful Improvements in Horseshoes, of which the following is a specification.

This invention relates to a horseshoe which is so constructed that it may be readily and reliably secured to the foot without nails or similar fastening devices.

Figure 1:
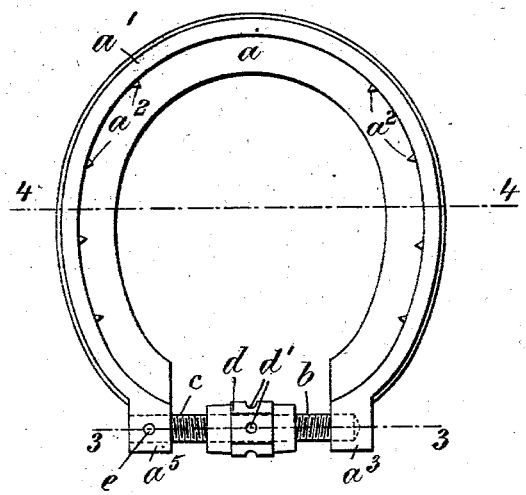
Figure 2:
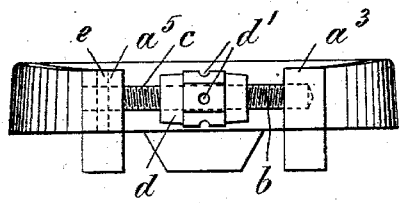
Figure 3:
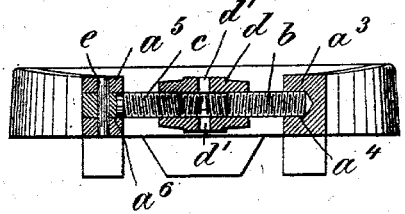
Figure 4:
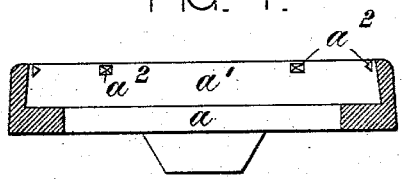

In the accompanying drawings, Figure 1 is a plan of my improved horse-shoe; Fig. 2, a rear view thereof; Fig. 3, a section on line 3 3, Fig. 1; and Fig. 4, a section on line 4 4, Fig. 1.

The letter $a$ represents the body of a horseshoe, made in one continuous piece and without a toe-hinge. From the body $a$ projects an inwardly-inclined flange $a'$, having spaced prongs $a^2$, which engage the foot. In order to draw the heels of the horseshoe evenly together, and thus hold the shoe to the foot without nails, I have devised the following construction: One of the heels $a^3$ is provided with a tapped socket $a^4$, and the other heel $a^5$ is provided with a reversely-tapped perforation $a^6$. The socket $a^4$ and perforation $a^6$ are engaged, respectively, by a left screw or bolt $b$ and a right screw or bolt $c$, the inner ends of which are placed at a slight distance from each other. The left screw is held against rotation by being tightly jammed into the socket $a^4$ or by a pin or other fastening. The right screw is held against rotation by a pin $e$, fitted into heel $a^5$.

The inner ends of the screws $b$ $c$ are engaged by a common cylindrical left-and-right nut $d$, which is centered between the heels $a^3$ $a^5$. If the nut is turned in either direction by means of a key engaging spanner-holes $d'$, the screws $b$ $c$ will be either drawn inward or projected outward to contract or spread the shoe. In this way the shoe may be readily clamped to the foot and may be as readily removed.

As the shoe is made in a single piece and its resiliency is limited, a difficulty arises in fitting a nut centrally upon the inwardly-extending screws engaging the heels. This difficulty is solved by my construction, the parts being assembled in the following manner:

The bolt $b$ is first screwed tightly into the socket $a^4$, and the nut $d$ is screwed upon the inner end of the bolt. The bolt $c$ is then passed from the outside through the perforation $a^6$ and rotated until its inner end is received by the nut, after which the outer end of the bolt is locked to the shoe by the pin $e$. In this way the parts are all fitted in their proper relative position between the heels and will not be apt to become displaced by wear.

What I claim is—

1. A horseshoe having a tapped socket in one heel, a tapped perforation in the other heel, a left screw and a right screw engaging the socket and perforation respectively, and a tubular left-and-right nut engaging the inner ends of the screws, substantially as specified.

2. A horseshoe having a tapped socket in one heel, a tapped perforation in the other heel, a left screw and a right screw engaging the socket and perforation respectively, a pin that locks the right screw to its heel, and a tubular left-and-right nut engaging the inner ends of the screws, substantially as specified.

Signed by me at New York city, (Manhattan,) New York, this 4th day of April, 1903.

MARTIN SCHWARTZ.

Witnesses:
WILLIAM SCHULZ,
F. V. BRIESEN.